US012546462B2

(12) United States Patent
Burkholder

(10) Patent No.: US 12,546,462 B2
(45) Date of Patent: Feb. 10, 2026

(54) ADJUSTABLE UTILITY LIGHTING SYSTEM

(71) Applicant: Jeffrey Lance Burkholder, Ephrata, PA (US)

(72) Inventor: Jeffrey Lance Burkholder, Ephrata, PA (US)

( * ) Notice: Subject to any disclaimer, the term of this patent is extended or adjusted under 35 U.S.C. 154(b) by 0 days.

(21) Appl. No.: 18/585,887

(22) Filed: Feb. 23, 2024

(65) Prior Publication Data

US 2024/0191865 A1 Jun. 13, 2024

Related U.S. Application Data

(63) Continuation of application No. 18/359,177, filed on Jul. 26, 2023, now Pat. No. 11,940,131.

(60) Provisional application No. 63/392,362, filed on Jul. 26, 2022.

(51) Int. Cl.

| | |
|---|---|
| ***F21V 19/02*** | (2006.01) |
| ***F21S 9/02*** | (2006.01) |
| ***F21V 14/02*** | (2006.01) |
| ***F21V 21/096*** | (2006.01) |
| ***F21Y 115/10*** | (2016.01) |

(52) U.S. Cl.

CPC ................ *F21V 19/02* (2013.01); *F21S 9/02* (2013.01); *F21V 14/02* (2013.01); *F21V 21/096* (2013.01); *F21Y 2115/10* (2016.08)

(58) Field of Classification Search

CPC .......... F21S 9/00–02; F21V 14/00–025; F21V 19/02; F21V 21/096–0965; F21V 21/14–32; F21W 2131/402; F21Y 2115/10

See application file for complete search history.

(56) References Cited

U.S. PATENT DOCUMENTS

| | | | |
|---|---|---|---|
| 4,965,708 | A | 10/1990 | Louis |
| 5,457,614 | A | 10/1995 | Duty |
| 6,120,163 | A | 9/2000 | Graber et al. |
| 6,808,289 | B2 | 10/2004 | Reed |
| 11,371,680 | B1 | 6/2022 | Rajasekaran |
| 2009/0303739 | A1 | 12/2009 | Garcia |

FOREIGN PATENT DOCUMENTS

DE 20100642 U1 * 3/2001 ............. F21S 6/003

* cited by examiner

*Primary Examiner* — Jason M Han

(74) *Attorney, Agent, or Firm* — Boudwin Intellectual Property Law, LLC; Daniel Boudwin

(57) ABSTRACT

An adjustable utility lighting system that includes multiple flexible supports for different lights to effectively illuminate multiple areas of the engine compartment simultaneously. The adjustable utility lighting system includes a base member that includes a plurality of adjustable support legs for securing the base member in position when the ferromagnetic surface is not available for the base member to mount to. There are also flexible supports that are permanently attached to the base member by a coupling that couples a first end of each of the flexible supports to the top surface of the base member. There is also a rechargeable battery that is a 18650 rechargeable battery that is easy to replace.

5 Claims, 3 Drawing Sheets

ADJUSTABLE UTILITY LIGHTING SYSTEM

CROSS REFERENCE TO RELATED APPLICATIONS

This continuation-in-part application claims the benefit of U.S. Provisional Application No. 63/392,362 filed on Jul. 26, 2022, and U.S. Nonprovisional application Ser. No. 18/359,177 filed on Jul. 26, 2023. The above identified patent applications are herein incorporated by reference in their entirety to provide continuity of disclosure.

BACKGROUND OF THE INVENTION

The present invention relates to a utility lighting system. More particularly, the present invention relates to an adjustable utility lighting system.

Vehicle engines require regular service and maintenance in order to function properly. Mechanics and other individuals often must locate and fix some issue within an engine compartment within a vehicle. The engine compartment is typically cramped and difficult to maneuver in because it is fil with many engine components. These engine components also tend to block light from entering the engine compartment, making it very difficult to see.

Some individuals utilize a handheld flashlight for visibility, which takes that hand away from being able to work on the vehicle. Other possible solutions involve attaching a light to a person's body, such as a headlamp or clip-on light, but these are typically not adjustable and only work to illuminate in a single direction unless the wearer repositions their body. Other types of work lights exist but lack the flexibility and adjustability needed to adequately illuminate the engine compartment.

In order to address these concerns, the present invention provides an adjustable utility lighting system that includes multiple flexible supports for different lights to effectively illuminate multiple areas of the engine compartment simultaneously. In light of the devices disclosed in the known art, it is submitted that the present invention substantially diverges in design elements from the known art and consequently it is clear that there is a need in the art for an improvement to existing adjustable utility lighting systems. In this regard the present invention substantially fulfills these needs.

SUMMARY OF THE INVENTION

In view of the foregoing disadvantages inherent in the known types of adjustable utility lighting systems now present in the prior art, the present invention provides an adjustable utility lighting system wherein the same may be utilized for providing added convenience for a user when using an adjustable utility lighting system.

The present system comprises an adjustable utility lighting system that includes a base member having a plurality of individual switches for controlling emitted light, a plurality of flexible supports extending from the base member, a light affixed to a second end of each of the flexible supports, and a shroud extended over each of the lights.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAIL DESCRIPTION OF THE INVENTION

Figure 1:
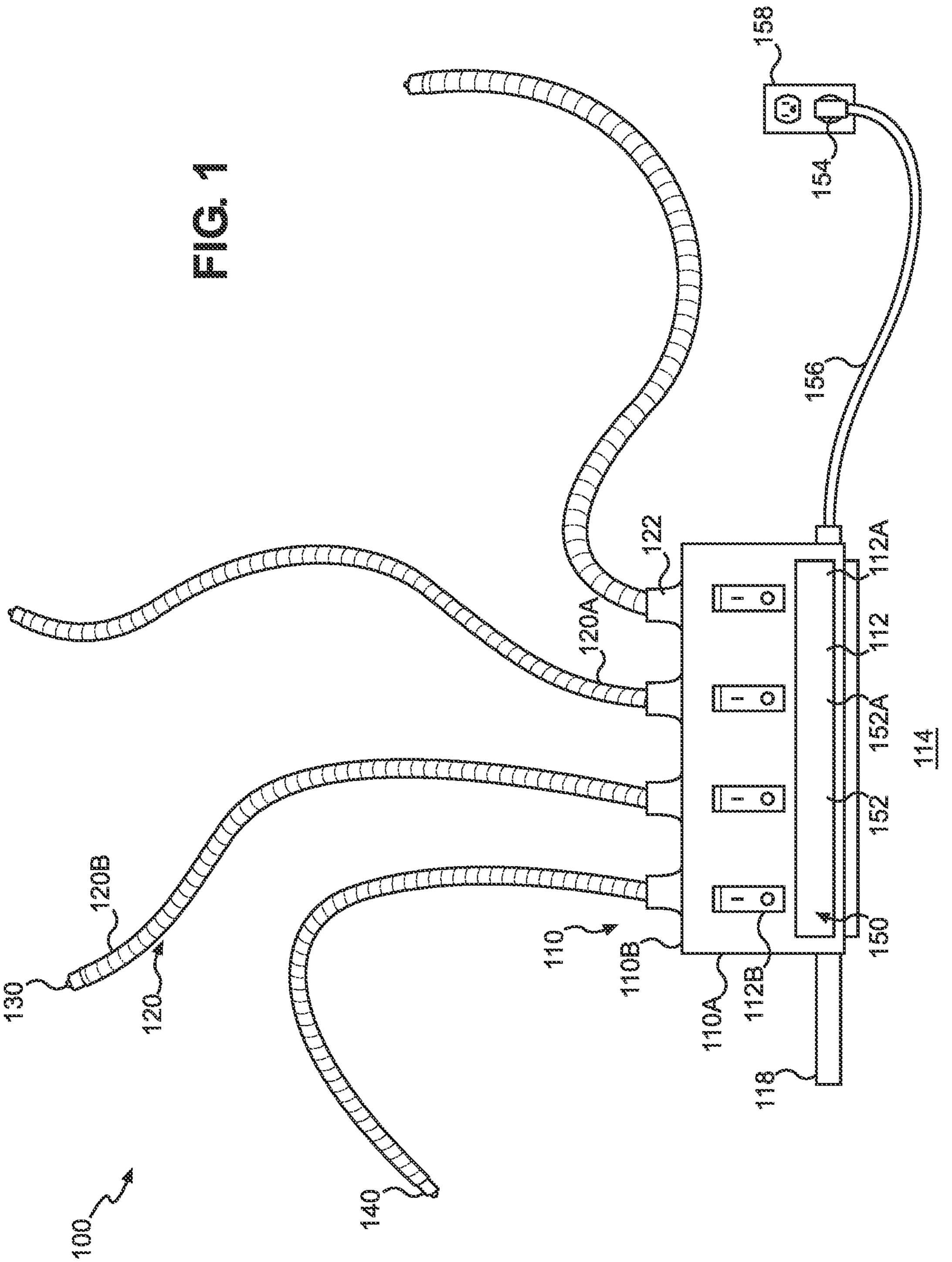
FIG. 1 shows a side perspective view of an embodiment of an adjustable utility lighting system.

Reference is made herein to the attached drawings. Like reference numerals are used throughout the drawings to depict like or similar elements of an adjustable utility lighting system. The figures are intended for representative purposes only and should not be considered to be limiting in any respect.

Referring now to FIG. 1 there is shown a side perspective view of an embodiment of an adjustable utility lighting system 100.

The adjustable utility lighting system 100 may include a base member 110, a plurality of flexible supports 120, a light 130, a shroud 140, and a battery compartment 150.

The base member 110 may have a magnetic bottom 112 to couple the base member 110 to a ferromagnetic surface 114 or the like. The base member 110 may include a plurality of individual switches 116 disposed on a side surface 110A of the base member 110 for controlling the operation of emitted light. The base member 110 may further include different support mechanisms for securing the adjustable utility lighting system 100 in place during use. As one example, the magnetic bottom 110A of the base member 110 may more specifically include a plurality of permanent magnets 112A that may secure the adjustable utility lighting system 100 to a ferromagnetic surface 114 or the like. The base member 110 may also include a plurality of adjustable support legs 118 for securing the base member 110 in position when there is no ferromagnetic surface 114 for the base member 110 to mount to. The base member 110 may be rectangular-shaped, circular-shaped, square-shaped, or the like.

The flexible supports 120 may extend upwardly from a top surface 110B of the base member 110. The flexible supports 120 may be permanently attached to the base member 110 by a coupling 122 that couples a first end 120A of each of the flexible supports 120 to the top surface 110B of the base member 110. The flexible supports 120 may be approximately at least 3 feet long and are approximately 5 mm wide.

A light 130 may be affixed to a second end 120B of each of the flexible supports 120, such that the user may adjustably position multiple light sources in desired directions.

A shroud 140 may extend partially over each of the lights 130 in order to ensure its emitted light is directed to a correct area for maximum illumination capabilities and to protect each of the lights 130.

A battery compartment 150 may provide electrical power when a battery 152 is contained within the battery compartment 150, or the user may utilize an attached wall plug 154 extending from a wire cord 156 for powering the adjustable utility lighting system 100 via a wall outlet 158 for hard-wired electric power. The battery 152 may be a rechargeable battery 152A or the like.

Figure 2:
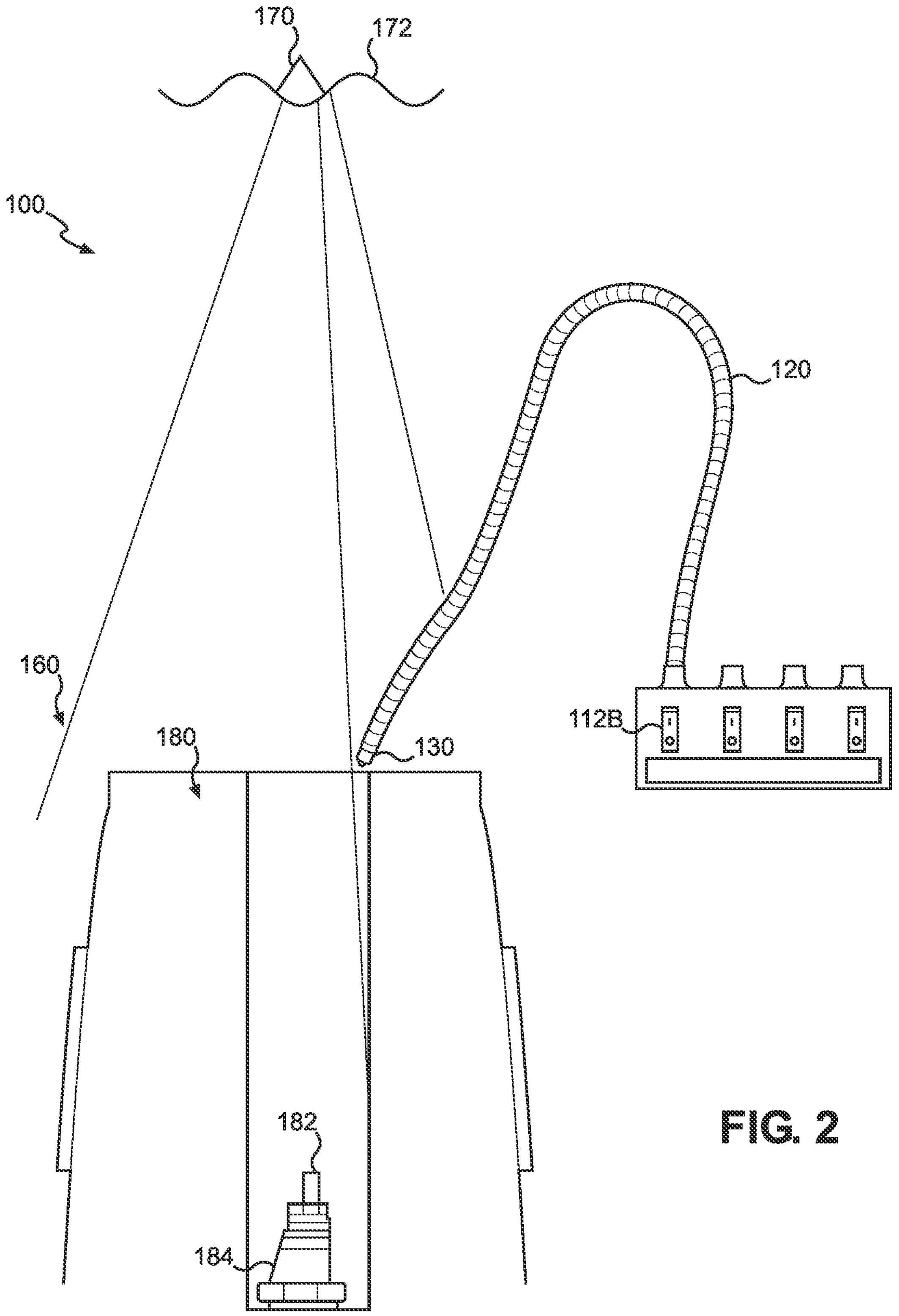
FIG. 2 shows an environmental side view of an embodiment of an adjustable utility lighting system in use to illuminate an area of an engine compartment.

Referring now to FIG. 2 there is shown an environmental side view of an embodiment of the adjustable utility lighting system 100 in use to illuminate an area of an engine compartment 160.

As shown, a Snap-On work light 170 has a wide, nonadjustable field of illumination. The human eye's field of view may be partially blocked by a work light housing 172, which leads to further reduced visibility while working. For example, the Snap-On type work light 170 and field of illumination does not adequately illuminate the narrow spark plug opening 182 within a cylinder head 180. In contrast, the flexible supports (FIG. 1, 120) may be easily positioned so that the lights (FIG. 1, 130) are oriented directly into a spark plug area 184. Since the flexible support 120 has a smaller profile and is not attached to user's body or clothing, it does not infer with the user's vision or field of view. In this way, the adjustable utility lighting system 100 may effectively illuminate multiple areas with the lights 130 as needed. The individual switches (FIG. 1, 112B) may be for each of the lights 130 and the lights are approximately 100 Lumens each.

Figure 3:
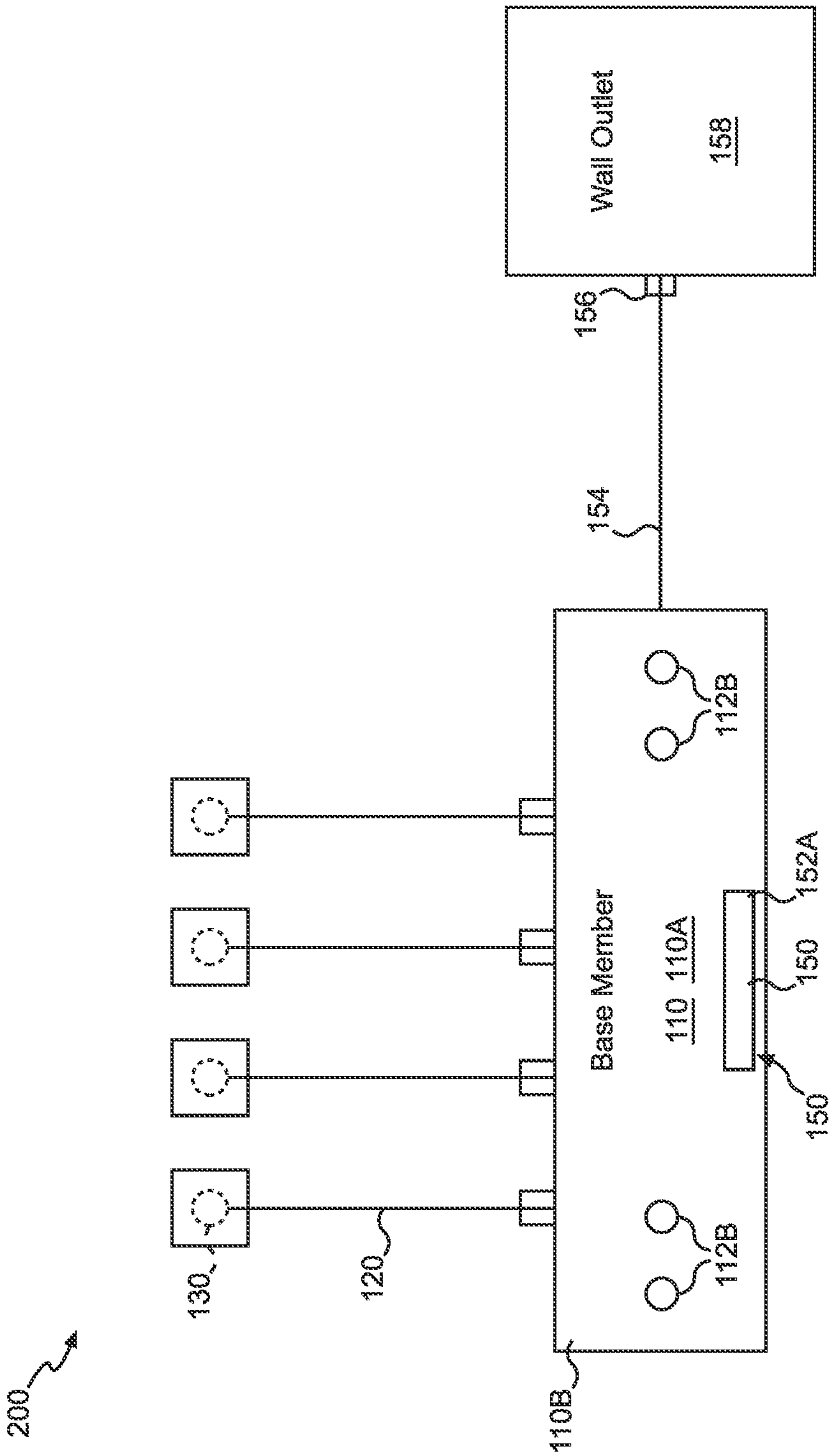
FIG. 3 shows an electrical diagram of an embodiment of an adjustable utility lighting system.

FIG. 3 shows an electrical diagram 200 of the adjustable utility lighting system 100.

The electrical diagram 200 may include a base member 110, a plurality of individual switches 112B, a plurality of lights 130, a battery 152, an attached wall plug 154, and a wall outlet 156.

The base member 110 may include an upper surface 110B. The individual switches 112B may be disposed on the upper surface 110B of the base member 110. The s 130 may be disposed on each of the first ends 120A of a plurality of flexible supports 120 extending upwardly from a side surface 110A of the base member 110. The battery 152 may be contained within a battery compartment 150 within the base member 110 and may be a 18650 rechargeable battery 152A that is relatively easy to replace. The attached wall plug 154 may extend from a power cord 156 to power the adjustable utility lighting system 100 via a wall outlet 158 as a hardwire source of electric power.

It is therefore submitted that the present invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable utility lighting system, comprising:

a base member having a plurality of flexible supports extending from the base member;

wherein the base member includes a magnetic bottom to couple the base member to a ferromagnetic surface;

wherein the magnetic bottom of the base member includes a plurality of permanent magnets;

wherein the base member includes a plurality of adjustable support legs for securing the base member in position when the ferromagnetic surface is not available for the base member to mount to;

wherein the flexible supports extend upwardly from a top surface of the base member;

wherein the flexible supports are detachable from the base member by a coupling that couples a first end of each of the flexible supports to the base member;

wherein a light is affixed to a second end of each of the flexible supports;

further comprising a battery compartment to provide electrical power when a battery is contained within the battery compartment; and wherein the adjustable utility lighting system is used to illuminate an area of an engine compartment.

2. The adjustable utility lighting system, according to claim 1, wherein the flexible supports have a smaller profile and are not attached to a user's body or clothing and do not interfere with a user's vision or field of view.

3. The adjustable utility lighting system, according to claim 1, wherein the flexible supports are at least 3 feet long.

4. The adjustable utility lighting system, according to claim 1, wherein the flexible supports are 5 mm wide.

5. The adjustable utility lighting system, according to claim 1, wherein the battery is a rechargeable battery.

* * * * *